No. 767,465. PATENTED AUG. 16, 1904.
J. A. WIRTH & J. BEECH.
SOLDERING APPARATUS.
APPLICATION FILED OCT. 22, 1902.
NO MODEL. 2 SHEETS—SHEET 1.
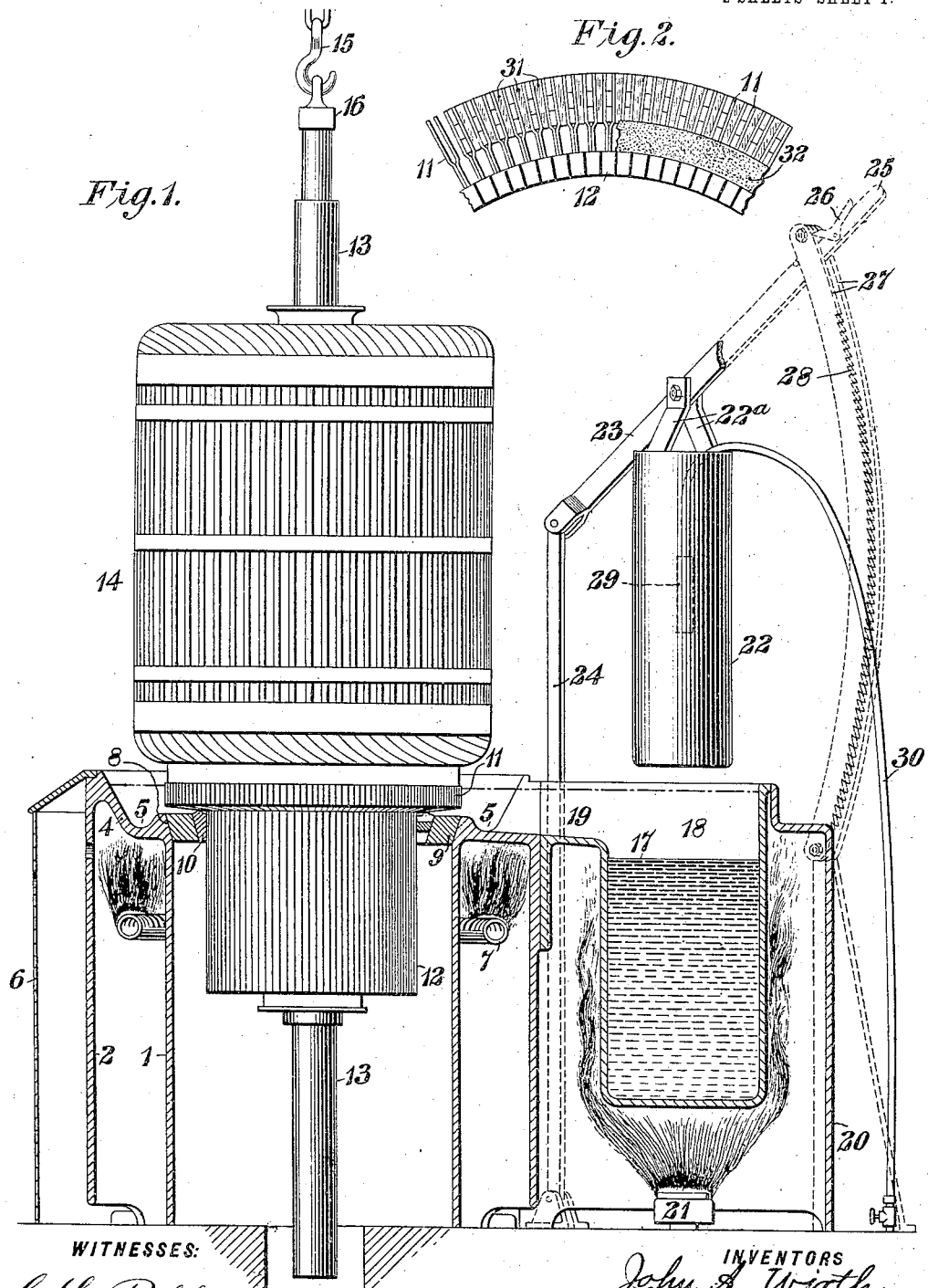

No. 767,465. PATENTED AUG. 16, 1904.
J. A. WIRTH & J. BEECH.
SOLDERING APPARATUS.
APPLICATION FILED OCT. 22, 1902.
NO MODEL. 2 SHEETS—SHEET 2.
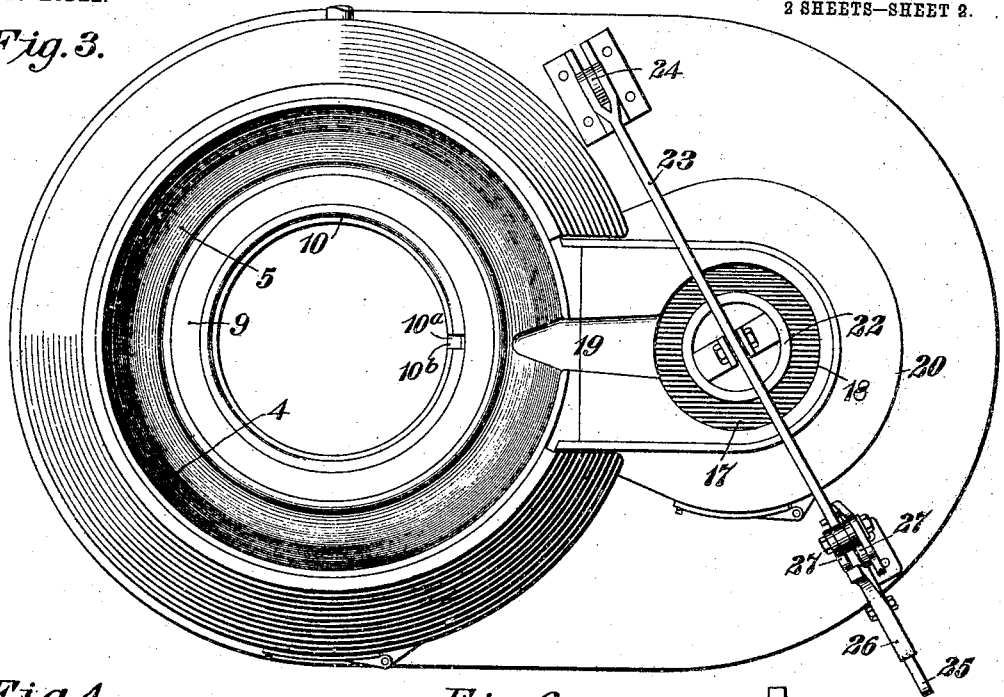
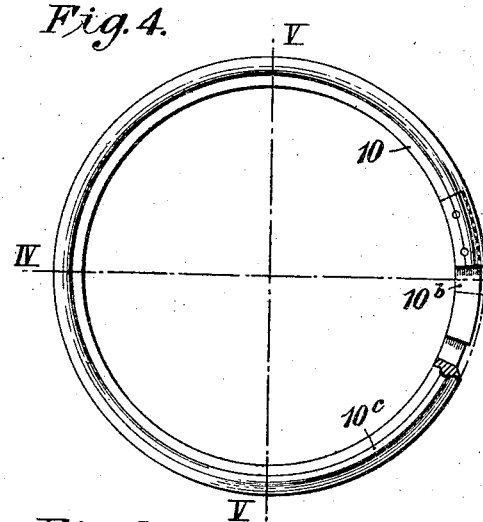
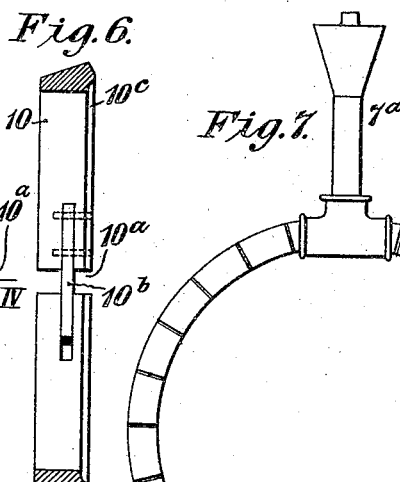
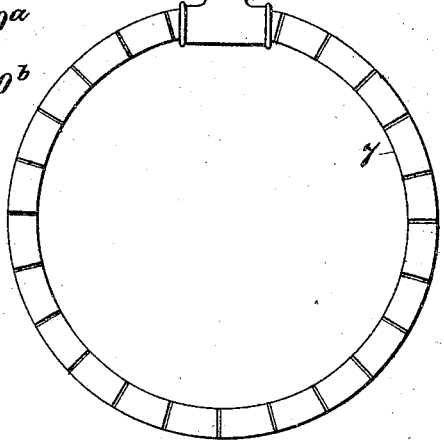
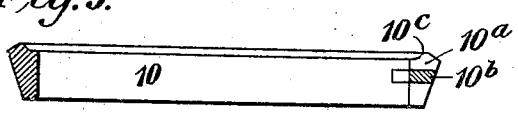
WITNESSES:
C. L. Belcher
J. C. Morse
INVENTORS
John A. Wirth
Jacob Beech
BY
Healey S. Carr
ATTORNEY.

No. 767,465.

Patented August 16, 1904.

UNITED STATES PATENT OFFICE.

JOHN A. WIRTH, OF PITTSBURG, AND JACOB BEECH, OF WILKINSBURG, PENNSYLVANIA, ASSIGNORS TO WESTINGHOUSE ELECTRIC & MANUFACTURING COMPANY, A CORPORATION OF PENNSYLVANIA.

SOLDERING APPARATUS.

SPECIFICATION forming part of Letters Patent No. 767,465, dated August 16, 1904.

Application filed October 22, 1902. Serial No. 128,359. (No model.)

*To all whom it may concern:*

Be it known that we, JOHN A. WIRTH, residing at Pittsburg, and JACOB BEECH, residing at Wilkinsburg, in the county of Allegheny, State of Pennsylvania, citizens of the United States, have invented a new and useful Improvement in Soldering Apparatus, of which the following is a specification.

Our invention relates to soldering apparatus; and it has for its object to provide means for soldering together a number of parts simultaneously instead of independently and consecutively, as has heretofore been the practice.

Our invention pertains, primarily, to means for soldering armature-leads to the necks of commutator-bars of electrical machines, and it will be described in connection with such apparatus, though not necessarily restricted thereto in its operation.

Our invention is illustrated in the accompanying drawings, in which—

Figure 1 is a view, partially in side elevation and partially in section, of the soldering apparatus and an armature and its commutator in position therein. Fig. 2 is an end elevation of a portion of an open-neck commutator and certain devices used in connection therewith in the soldering operation. Fig. 3 is a plan view of the apparatus shown in Fig. 1, the armature and commutator being removed. Fig. 4 is a plan view of a supporting-ring for an armature and commutator. Fig. 5 is a sectional view on line IV IV of Fig. 4, and Fig. 6 is a sectional view on line V V of Fig. 4. Fig. 7 is a plan view of a gas-burner forming part of the apparatus.

As shown in the drawings, we provide two cylindrical concentric shells 1 and 2, connected at their upper ends by a curved web 4 of such form as to provide an annular basin 5, the outer wall of the basin being materially higher than the inner wall. The shell 2 is surrounded by a casing 6, and between the shells 1 and 2 and near the upper end of the space formed between them is located an annular pipe 7, having slits cut therein and serving as a burner for gas that is supplied thereto through a suitable pipe and mixer $7^a$.

The inner wall of the web 4 is of inclined or flaring contour to receive and hold a master-ring 9, the outer surface of which closely fits the surface 8 and the inner surface of which is similarly flaring or inclined to receive a ring 10, having a cylindrical inner periphery of such diameter as to fit the commutator to be soldered. As shown, the ring 10 is split, so as to be susceptible of slight spring adjustment, and the space $10^a$ between its adjacent ends is closed by a curved tongue $10^b$, one end of which is fastened in a corresponding slot in one end of the ring and the other end of which fits into a similar slot in the other end of the ring, this tongue being provided in order to prevent molten solder from passing into the interior of the shell 1. As shown, the ring 10 is also provided with an annular ridge $10^c$ on its upper edge, upon which rest the necks 11 of the commutator 12, the latter and the shaft 13 projecting into the space within the shell 1.

The commutator and the armature 14 are assembled upon the shaft 13 and are substantially complete, except for the soldering operation, prior to being placed in the position indicated in Fig. 1 of the drawings, and they may be placed in that position by means of a suitable crane the hook 15 of which is connected to the shaft 13 by any suitable connecting device 16.

The solder 17 to be supplied to the annular basin 5 is contained in a molten condition in a pot 18, which is in open communication with the basin 5 at its top by means of a channel 19, the bottom of which is slightly inclined downwardly from the basin to the pot. The pot is surrounded by a casing 20, and the heat for maintaining the solder 17 in a molten condition is provided by a flame from a suitable gas-burner 21, located beneath the pot and supplied with gas from any suitable source.

The solder is forced from the pot through the channel 19 into the basin 5 by means of a plunger 22, which is provided at its top with arms 22ª, the upper ends of which are pivotally attached to a lever 23, the latter being pivotally supported at one end upon a substantially vertical rod or bar 24 and having at its other end a handle 25 and a pawl 26. The handle extends and is operated between two curved arms 27, one of which is provided with ratchet-teeth 28 to be engaged by the pawl 26.

The plunger 22 may be provided with a cavity having a gas-burner 29 to be supplied with gas from any suitable source through a flexible pipe 30 in order that the plunger may be heated before introduction into the molten solder in the pot 18, if desired, though these features are not essential parts of our invention.

The plunger 22 is shown in an artificial position, which may be maintained only by the operator or by a temporary supporting device that is not shown in the drawings. The pawl 26 and ratchet-teeth 28 are employed solely to lock the plunger in the various positions to which it may be adjusted against the upward pressure of the molten solder when partially submerged therein.

In order to use the apparatus in accordance with the most desirable practice, the combined armature and commutator is placed in the position indicated in Fig. 1, the armature-leads and the parts of the commutator-necks which are to be soldered thereto being first tinned and then assembled in proper relative position. The plunger 22 is then lowered gradually notch by notch and the solder thus forced out through the passage 19 into the basin 5 until its level is such that the necks are substantially submerged, care being taken, however, before forcing the solder into the basin 5 that the commutator-necks and the adjacent parts of the apparatus are heated by means of the flame from the burner 7 to such temperature as will insure satisfactory operation of the solder. The parts are allowed to remain with the necks submerged in the molten solder for a few moments until the soldering action is completed, and then the plunger is raised to permit the surplus solder to run back into the pot. The armature will then be removed and another inserted in its place and the operation repeated.

In case the commutator-necks are separated by solid insulation only the apparatus described will be sufficient for the purpose; but if the necks are separated by air-spaces it will generally be found desirable to either wholly or partially fill the spaces with non-metallic wedges 31, and if such wedges do not completely fill the spaces the portions left unfilled may be closed to prevent the entrance of the solder by means of a ring 32, of asbestos or other suitable refractory material, as indicated in Fig. 2.

The details of construction may obviously be varied from what is shown within considerable limits without departing from our invention.

We claim as our invention—

1. The combination with a supporting-frame having a circular opening and an annular basin surrounding said opening, of means for supplying molten solder to said basin and for withdrawing the same therefrom.

2. Soldering apparatus for armature-leads and commutator-necks comprising a frame having a circular opening through which the body of the armature and its shaft may project, an annular basin surrounding the said opening, a reservoir for molten solder, a conduit between said reservoir and said basin and a plunger to force the solder from the reservoir, through the channel, into the basin.

3. In soldering apparatus, the combination with a frame having a circular opening at its upper end surrounded by an annular basin, of one or more supporting-rings removably fitted into said opening and means for introducing a body of molten solder into said basin and withdrawing the same therefrom.

4. In soldering apparatus, the combination with a frame having a circular opening at its upper end surrounded by an annular basin, of one or more supporting-rings removably fitted into said opening, means for applying heat to said basin and rings and means for introducing molten solder into the said basin and withdrawing the same therefrom.

5. The combination with a frame having a circular opening in its upper end surrounded by an annular basin, of one or more supporting-rings removably fitted into said opening, means for heating said basin, a pot connected with said basin by a channel and a plunger for forcing the molten solder from said pot through the channel into the basin.

6. The combination with a frame having a circular opening in its upper end surrounded by an annular basin, of one or more supporting-rings removably fitted into said opening, means for heating said basin, a pot containing solder and having its upper end connected to the basin by means of a channel, means for maintaining the solder in the pot in a molten condition and a plunger for forcing the solder from the pot into the basin.

7. The combination with a frame having a circular opening at its upper end surrounded by an annular basin, of one or more supporting-rings removably fitted into said opening, means for heating said basin, a pot connected at its upper end with said basin by a channel, means for heating the pot and its contents, a plunger for forcing the contents of the pot into the basin and means for locking the plunger in whatever position it may be made to assume in order to retain the molten solder in the basin the length of time desired.

8. The combination with a frame having a circular opening at its upper end surrounded by an annular basin, of one or more supporting-rings removably fitted into said opening, an annular heater located beneath said basin, a pot adapted to contain molten solder and connected at its upper end to the basin by a channel, a heater located beneath said pot, a plunger for forcing the molten solder through said channel into said basin, means for raising and lowering the plunger and means for locking it in any desired position.

9. The combination with a frame having a circular opening at its upper end surrounded by an annular basin, of one or more supporting-rings removably fitted in said opening, an annular heater located beneath the basin, a pot adapted to contain molten solder and connected at its upper end to said basin by a channel, a heater located beneath the pot, a plunger provided with means for heating it, means for raising and lowering the plunger and means for locking it in any position to which it may be adjusted.

10. The combination with a cylindrical frame having an opening at its top surrounded by a basin, of one or more supporting-rings removably fitted in said opening, an annular heater located beneath the basin and means for introducing molten solder into the basin and withdrawing the same therefrom.

11. In soldering apparatus, the combination with a frame provided with a heater and having a circular opening in its upper end, of a master-ring removably fitted in said opening and a split ring having a tongue closing the space between its ends and automatically adjustable with reference to one of said ends.

12. In soldering apparatus, the combination with a frame having a circular opening in its top surrounded by an annular basin, of a master-ring removably seated in said opening and a split ring adapted to fit the interior of said master-ring and having automatically-adjustable means for closing the space between the adjacent ends of the ring.

In testimony whereof we have hereunto subscribed our names this 18th day of October, 1902.

JOHN A. WIRTH.
JACOB BEECH.

Witnesses:
JAMES B. YOUNG,
GEO. L. DOBERNECK.